May 13, 1958  E. J. HOUDRY  2,834,657
CATALYTIC MUFFLER

Filed March 8, 1954  2 Sheets-Sheet 1

INVENTOR.
EUGENE J. HOUDRY
BY
William M. Epes
ATTORNEY

May 13, 1958  E. J. HOUDRY  2,834,657
CATALYTIC MUFFLER
Filed March 8, 1954  2 Sheets-Sheet 2

INVENTOR.
EUGENE J. HOUDRY
BY
*William M. Eger*
ATTORNEY

United States Patent Office 2,834,657
Patented May 13, 1958

2,834,657
CATALYTIC MUFFLER

Eugene J. Houdry, Ardmore, Pa., assignor to Oxy-Catalyst, Inc., a corporation of Pennsylvania Application March 8, 1954, Serial No. 414,715

6 Claims. (Cl. 23—288)

This invention relates to catalytic apparatus of the type useable with an internal combustion engine for oxidizing the toxic and obnoxious components of the exhaust gases therefrom. The exhaust gases of internal combustion engines such as ordinary gasoline or diesel engines contain a mixture of carbon monoxide and various hydrocarbons which is both poisonous and nauseating. Carbon monoxide is a deadly poison even when present in the atmosphere in concentrations as low as 0.01% by volume, and the hydrocarbons contained in exhaust gases are extremely nauseous and objectionable, even when exhausted in a comparatively open space such as a city street. Where internal combustion engines are operated within a confined space such as a garage or warehouse, a serious problem exists with respect to the carbon monoxide, it usually being deemed necessary to either provide a high capacity ventilating system in order to assure a supply of fresh air to persons within the building, or to convey the engine exhausts to the exterior of the building by exhaust piping. The danger of accidents resulting from the inhalation of carbon monoxide is, nonetheless, a constant source of concern, and deaths resulting from this gas are relatively frequent occurrences.

The nuisance created by internal combustion engine exhausts has inspired the invention of many devices during the past forty years which purport to eliminate the toxic and obnoxious components therefrom. One of the most prevalent types of devices which have been proposed is that of a catalytic muffler to be attached to the exhaust line of the engine in order to catalytically oxidize the toxic and obnoxious components of the exhaust gases. None of these devices have in the past been successfully commercialized, probably because of such practical considerations as back pressure, the size of the device, the active life span of the catalyst employed, and the ability of the device to withstand the elevated temperatures attained in the catalytic oxidation of exhaust gases.

It has been generally determined that a successful catalytic muffler can be provided in the form of a housing having a bed of catalytic pellets therein, preferably with the bed extending longitudinally and laterally within the housing for substantially the full length and width thereof. In this type of muffler, the catalytic bed divides the interior of the housing into a plurality of chambers, each of which is coextensive with the bed such that exhaust gases introduced into one of the chambers flow through the bed into another of the chambers from whence they can be exhausted to the atmosphere with their toxic and obnoxious components removed. In catalytic mufflers of this type one of the most difficult problems is that of supporting the catalytic bed within the housing so that all exhaust gases will be forced through the material comprising the bed, and thus be oxidized. This problem is complicated by the fact that the temperatures attained in catalytic oxidation are quite high, of the order of 1000° F. to 1800° F., and structural materials must be carefully chosen and arranged in order to withstand temperatures within this range.

In the previously developed catalytic mufflers of the type described above, it has been found that the bed can successfully be contained between opposed foraminous trays or plates of a high temperature alloy such as stainless steel. However, even with relatively temperature resistant materials such as stainless steel, it is necessary to provide a sufficient support for the trays because of the fact that at temperatures within the operating range (1200° F. to 1800° F.) these materials will tend to sag and the structural components of the muffler are liable to fail.

In the copending application of Eugene J. Houdry, Serial Number 318,382, filed November 3, 1952, for Catalytic Apparatus, there is disclosed a catalytic muffler of the type described above in which the foraminous trays are supported by a pair of elongated beams arranged on either side of the bed. That is to say, the beams extend longitudinally within the housing of the apparatus outside of the space between the opposed trays, which space receives the catalytic bed. The beams of Houdry application Serial Number 318,382, are carried within the muffler housing by hangers in such manner that the beams and the trays can respond to the abrupt temperature changes incident to catalytic oxidation of exhaust gases independently of each other. In another copending application of Eugene J. Houdry, Serial Number 408,175, filed February 4, 1954, for "Device for Catalytically Purifying Exhaust Gases," there is disclosed an alternative method of supporting the foraminous trays. In the latter application, the trays are supported only by guideways provided on the internal surface of the housing, the edges of the trays extending within and being received by the guideways in such manner that the trays may thermally expand and contract independently of the housing. The type of catalytic muffler disclosed in application Serial Number 318,382, is particularly adapted to mufflers of relatively large size, having trays of extensive length and area, since in mufflers of this size a central support for the trays is essential in order to prevent sagging or failure. The type of muffler disclosed in application Serial Number 408,175 is, on the other hand, particularly adaptable to mufflers of rather limited size where the trays are of only limited length and area.

The present invention provides a catalytic muffler of the same general type in which a single beam is provided for each set of opposed trays, with the beam disposed within the space between the trays and providing support for the central portion thereof. Mufflers of the type disclosed in the present invention provide the advantages of a beam-supported tray while using only a single beam for each pair of trays which is supported by the housing in a simplified manner. As will appear from the description which follows, the beam and tray assembly provided by the invention presents a unitary structure which may be readily inserted into and removed from the muffler housing.

A further aspect of the present invention is that of providing edge support for the trays, as well as beam support; that is to say, each foraminous tray in the present invention is supported centrally by a beam and also at its edges. The present invention also provides a heat exchange means whereby the heat generated by the exothermic oxidation of the exhaust gases can be transferred from the foraminous trays and the beam to the gases flowing in the chambers described above. Heat transfer of this type is highly desirable in catalytic mufflers because as noted above, the trays are heated to high temperatures, and are therefore subject to failure. Also, the heat from the trays may be transferred to incoming exhaust gases whereby these gases are raised in temperature, which makes them more receptive to the beneficial effects of the catalyst.

It is accordingly one of the objects of the present invention to provide a catalytic muffler having an improved support for foraminous trays mounted therein.

It is a further object of the present invention to provide a catalytic muffler having foraminous trays in which sagging and warping of the trays under extreme conditions of temperature will be prevented.

It is a further object of the invention to provide a catalytic muffler having a beam and tray assembly which may be readily inserted into and removed from the muffler housing as a unit.

It is still a further object of the present invention to provide a catalytic muffler containing heat transfer means operative to cool some of the structural parts of the muffler.

It is a further object of the present invention to provide a catalytic muffler in which a heat exchange means is operative to preheat raw exhaust gases prior to catalytic oxidation thereof, in order to encourage such catalytic oxidation.

Other objects of the present invention will be apparent from the following description and from the annexed drawings in which.

Figures 1, 5:
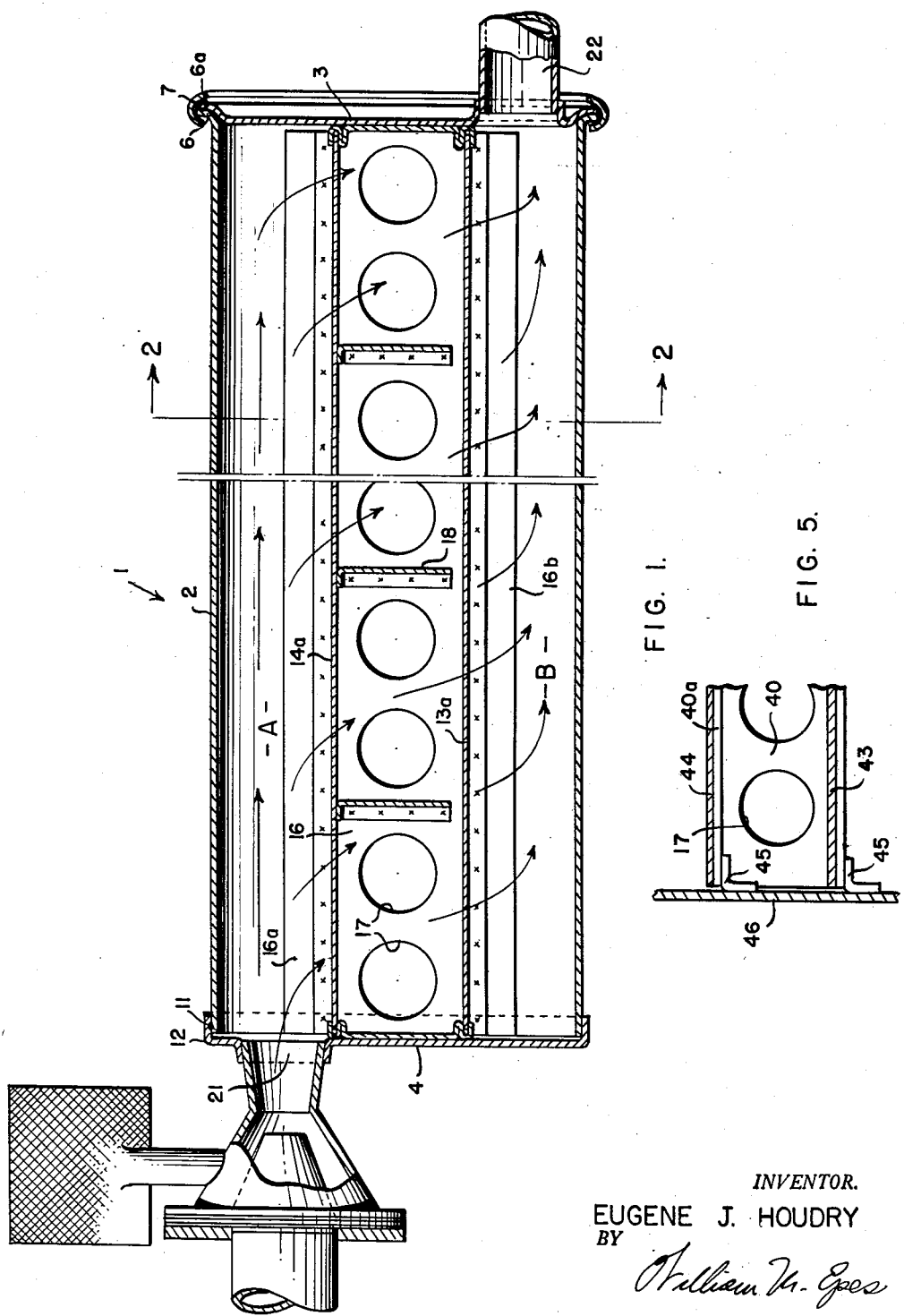
Fig. 1 represents a cross-sectional longitudinal view of one embodiment of the present invention taken along the lines 1—1 of Fig. 2.
Fig. 5 is a view showing the manner in which the beam shown in Fig. 4 is supported at its ends within the housing of the muffler.
Figure 2:
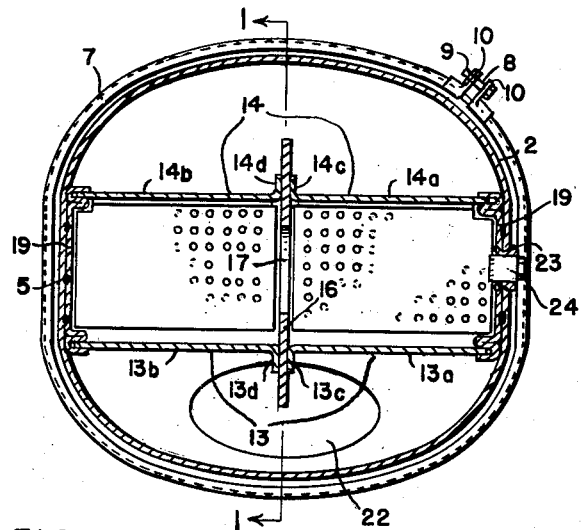
Fig. 2 represents a view taken at right angles to Fig. 1 along the lines 2—2 thereof.
Figure 3:
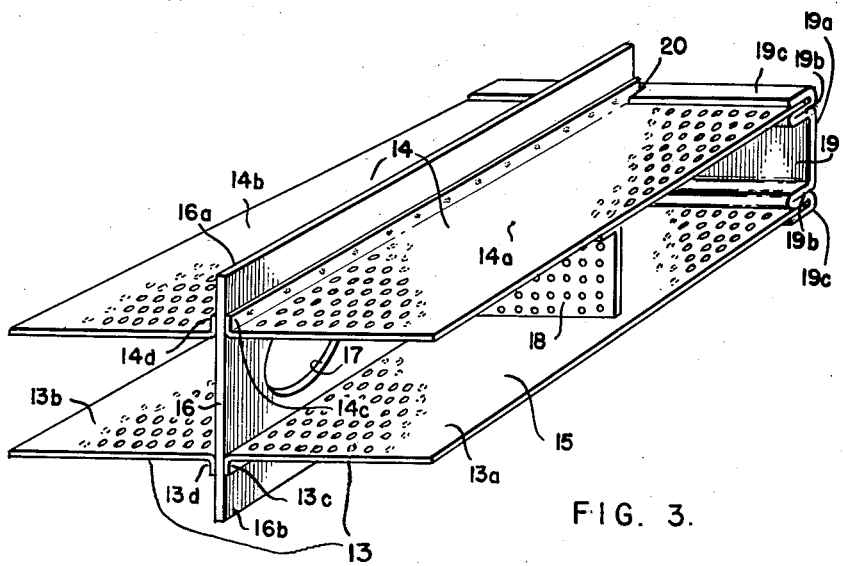
Fig. 3 represents a perspective view of the foraminous trays of the present invention secured to a central member which acts as a supporting beam and a heat exchanger.

Referring first to Figs. 1 to 3, it can be seen that the preferred embodiment of my invention comprises a generally elongated housing 1 which consists of a shell member 2 closed at its ends by end plates 3 and 4. As clearly shown in Fig. 2, the shell member 2 is of generally elliptical cross-section with two opposed surfaces on the major axis of the ellipse being flattened and parallel. The housing as shown in Fig. 2 may be provided for purposes of convenience of manufacture in two sections which are welded along their meeting edges as shown at 5 in Fig. 2. End plate 3, shown at the right of Fig. 1, is provided as a removable cover which is flanged around its periphery, which flange 6a abuts a mating flange 6 provided on the end of shell member 2. A U-shaped locking member 7 straddles the abutting flanges 6, 6a, and retains them in substantially air-tight relationship. Locking member 7 is split and connected across the split ends by an adjustable connection such as a machine screw 8 and nut 9, which cooperate with perforate ears 10 provided on the ends of the locking member. As shown at the left of Fig. 1, end plate 4 is permanently welded to shell member 2 by spot welds 11, the end plate 4 being provided with depending flanges 12 which overlap the shell member 2.

Mounted internally of the shell member 2 are two opposed foraminous trays 13 and 14 which extend axially within the shell member for substantially the full length thereof. These trays are mounted in opposed face-to-face relationship to define therebetween a space 15 (Fig. 3) for receiving a bed of catalyst pellets. Each tray, as clearly shown in Figs. 2 and 3, is provided in two coplanar side-by-side coextensive sections, 14a, 14b in the case of the upper tray, and 13a, 13b in the case of the lower tray.

Extending longitudinally within the housing and substantially medially thereof, I provide a member 16 in the form of an elongated beam of considerable width. Beam 16 as shown in Figs. 1 to 3, acts as a support for the trays 13, 14, and serves the additional function of a heat transfer means. In the embodiment of Figs. 1 to 3, this beam is of substantially rectangular cross-section, and extends in the space between the side-by-side tray sections 14a, 14b, and 13a, 13b. Each tray section is provided with flanges, indicated by the reference numerals 14c, 14d, and 13c, 13d, which abut the beams 16 and are secured thereto as by welding. As is apparent from Figs. 2 and 3, the beam 16 effectively divides the space 15 into two side-by-side compartments. Holes 17 provide communication between these compartments for purposes which will be described below.

Divider plates 18 shown in Figs. 1 and 3 extend transversely within the space 15, and further compartment this space into sections of limited extent axially of the housing. The purpose of these dividers 18 is fully set forth in the copending application of Eugene J. Houdry, Serial Number 438,423, filed June 22, 1954, for Catalytic Exhaust Purifier.

The trays 13, 14 are supported along their longitudinal and transverse edges adjacent the internal surface of the housing 1 by guideways provided by members 19 shown in Figs. 2 and 3. These members 19 can be rolled from ordinary sheet material to provide a flat central portion 19a with doubled upstanding flanges 19b and end flanges 19c, the flanges 19b and 19c along each side of the member 19 being spaced from each other a distance sufficient to receive the edges of the trays as shown clearly in Figs. 2 and 3. The members 19 are secured to the internal surface of the shell 2 along the flattened portion thereof, and are secured to the end plates 3 and 4 at the same level. In this manner the members 19 provide endless guideways extending around the interior of the housing 1. As shown in Fig. 3, these members 19 are notched as at 20 in order to receive the ends of the beam 16, which, of course, cannot extend within the guideways. If desired, the members 19 may be omitted from the shell 2 and provided only on the end plates 3 and 4. Also the trays 13, 14 might be stiffened by means of ribs pressed thereinto in order to minimize any tendency toward sagging in the trays under conditions of extreme load and temperature as explained in my copending application Serial Number 318,382.

It is apparent from Figs. 2 and 3 that the member 16 and the trays 13, 14 constitute in effect a single unit which is supported by the guideways. This type of structure provides ease of assembly and disassembly of the components of the device while permitting a rapid method of charging the catalytic pellets as described below. To assemble the components of the device it is merely necessary to insert the tray-beam unit into the guideways and secure the end plate 3 over the open end of the shell. The guideway type support permits this single unit to expand and contract independently of the housing since the edges of the trays extend within the guideways but not to the base of the guideways as shown in Fig. 2. A clearance of the order of 1/8" to 1/16" is sufficient to permit the tray-beam unit to expand and contract without the development of thermal stresses.

The trays 13, 14 as shown in Fig. 1 divide the interior of housing 1 into two coextensive chambers, an upper chamber A and a lower chamber B. Each of these chambers is coextensive with the trays, and is unobstructed over its entire length within the housing. An exhaust gas inlet 21 provided in end plate 4 communicates with chamber A, while an exhaust gas outlet 22 communicates with chamber B. This arrangement permits exhaust gases to be introduced into one of the chambers and to flow through the bed into the other chamber and out of the outlet. As shown in Fig. 1, inlet 21 is provided in the form of a Venturi inspirator for the purpose of mixing fresh air with the raw exhaust gases in order to insure substantially complete catalytic oxidation.

The space 15 is filled with catalytic pellets of a type described below. These pellets may be inserted into the space 15 by means of charging openings 23 provided in the housing 1. These charging openings are closed by removable plugs 24, so that when it becomes necessary to recharge the catalyst bed, it is only necessary to remove the plugs 24 and insert catalytic material through the opening 23. By virtue of the openings 17, pellets inserted through the opening 23 will be distributed on both sides of the member 16. Alternatively it is contemplated that the catalytic pellets might be provided in combustible cartridge casings dimensioned to fit within the space between the opposed trays 13, 14. With such an arrangement, the operation of recharging the muffler with fresh catalyst would require only the steps of removing the tray-beam unit, emptying the spent catalyst, inserting the cartridges into the spaces 15 and reassembling the tray-beam unit to the housing. Operation of the engine would then produce sufficient heat to oxidize the combustible cartridge casings and leave a fresh charge of catalytic pellets in the bed. With such cartridges it would not, of course, be necessary to remove the plugs 24 and insert the catalyst pellet-by-pellet into the space between the opposed trays.

The materials employed in the construction of a muffler embodying the principles of my invention should be chosen with reference to the conditions which will be encountered in the operation thereof. The trays 13, 14, the beam 16, and the dividers 18 should be constructed from stainless steel or some other alloy capable of withstanding operating temperatures in the range of 1200° F. to 1800° F. The trays 13, 14, and the dividers 18 are preferably of a relatively light gage metal, for example 22 U. S. gage, and are provided with small diameter perforations of for example, about 0.062" in diameter over their entire surfaces in order to permit the passage of exhaust gases. It has been found that only the lighter gages of relatively tough materials such as stainless steel and other high temperature alloys can be economically perforated. The trays of relatively light gage material are inclined to sag under conditions of extreme load and temperature, and the provision of adequate support, therefore, is highly important. The members 19, the shell 2, and end plates 3, 4, of the preferred embodiment of the present invention may be formed from ordinary cold rolled steel since these components are not subjected to the extremely rigorous operating conditions which the trays 13, 14 and beam 16 are subjected to.

The present invention is not, of course, limited to useage with a particular catalyst. However, one catalyst which has been found to be particularly satisfactory consists of pellets of catalytic alumina impregnated with about 0.4% of platinum. The pellets may advantageously be provided in the form of cylinders of about 1/8" to 1/16" in diameter, and approximately the same length.

In the operation of the disclosed embodiment of the invention, the exhaust gases which have been previously mixed with fresh air from the atmosphere by means of an inspirator are admitted into chamber A of Fig. 1, and distribute themselves throughout the length and width of this chamber. These gases, containing carbon monoxide and hydrocarbons, then flow through the catalytic bed within the space 15 and into the chamber B. In flowing through the bed of catalyst pellets the carbon monoxide is oxidized directly to carbon dioxide and the hydrocarbons are oxidized to produce carbon dioxide and some water vapor. The mixture of gases exhausted through outlet 22 then consists of carbon dioxide, water vapor, the usual inert gases of the atmosphere, and perhaps some free oxygen rather than a highly toxic and obnoxious mixture containing carbon monoxide and hydrocarbons.

The disclosed embodiment of the present invention is particularly adapted to use with gasoline powered spark-ignition engines which produce exhaust gases containing at idle for example from 4% to 9% carbon monoxide and appreciable amounts (up to about 4%) hydrogen.

The exhaust gases of engines of this type do not contain sufficient free oxygen to permit complete oxidation of these oxidizable constituents, but do contain sufficient sensible heat to initiate the catalytic reactions. The principles of the present invention are, however, applicable to diesel engines which produce exhaust gases containing on the average only minor amounts of carbon monoxide (for example about 0.1%), but which do contain more free carbon, aldehydes and free oxygen than spark-ignition engines. In practicing the present invention with diesel-type engines it would be desirable to provide a burner or some other means for heating the exhaust gases prior to catalytic oxidation since diesel exhausts, as a general rule, do not contain sufficient sensible heat to sustain the catalytic reaction involved. Furthermore, with a diesel engine, the inspirator shown in Fig. 1 would be eliminated since, as noted above, the free oxygen content of the exhaust gases is sufficient to oxidize substantially all of the combustible matter contained.

The oxidation reation fostered by the catalysts are, of course, exothermic, which means that the gases in chamber B will generally contain more sensible heat than the exhaust gases released by the engine or the mixture of the exhaust gases and fresh air admitted into chamber A through inlet 21. The amount of heat generated by the exothermic oxidation can be appreciated from the following approximate temperatures which exist in catalytic mufflers. Under ordinary conditions of operation, the temperature of the catalytic bed may vary between extremes of 500° F. to 1800° F., while the temperature of the exterior skin of shell member 2 may vary between extremes of about 250° F. to 750° F. The opposed foraminous trays, and particularly lower tray as viewed in Fig. 1, will operate at a temperature which will approach the temperature of the catalyst bed. Furthermore, as the engine's speed is varied, the volume of exhaust gases produced by the engine will correspondingly be varied, and the amount of heat liberated within the catalyst bed will correspondingly vary. These variations in amount of heat liberated will cause abrupt changes in the dimensions of the trays in the member 16, particularly since these members are of relatively light gage and therefore low heat capacity. From these considerations it is apparent that muffler structures must be such that these abrupt dimensional changes will be acccommodated without the imposition of severe thermal stresses. Such severe thermal stresses would, in the case of light gage structural components, cause warping and eventual failure.

In the present invention the beam 16 supports the trays 13, 14 centrally thereof at the precise position where the load is greatest while providing a structure which is relatively simple to manufacture and assemble. Furthermore, the beam-tray unit 13, 14, 16 is carried by the guideways in such manner that the imposition of severe thermal stresses is avoided. The trays can, of course, elongate or become wider under the influence of violent fluctuations in temperature, and such elongation can be accommodated by the guideways 19a, 19b, since there is no rigid connection between the guideways and the trays, and sufficient clearances provided to permit this elongation without stressing any of the parts.

The portions 16a, 16b, of the beam 16 which extend into the upper chamber A and lower chamber B respectively, serve an additional function of transferring heat to the gases flowing in chambers A and B. The heat liberated in the oxidation reactions explained above is, of course, liberated within the catalytic bed in space 15. Some of this heat is carried by the gases into chamber B and exhausted to the atmosphere as sensible heat. On the other hand, some of this heat goes to raise the temperature of the central portions of beam 16 and the trays, which as a result become extremely hot during operation. The central portions of the beam 16 will be subjected to particularly severe temperatures for the reason that it is surrounded by the catalytic pellets which attain temperatures in the range of 1200° F. to 1800° F. The portions 16a, 16b of member 16 function to transfer some of the heat liberated in the catalytic bed to the gases flowing in the chambers A and B by conduction and by convection. Thus, the incoming exhaust gases entering upper chamber A through inlet 21 will, in contacting portion 16a of member 16, be heated by heat conducted from the center portions of the catalytic bed. This transfer of heat from the catalytic bed and the beam 16 to the incoming exhaust gases is particularly desirable, since, as noted above, the catalytic oxidation of the exhaust gases will take place only at elevated temperatures, and it is therefore desirable to have the incoming unoxidized exhaust gases at a relatively elevated temperature when they are introduced into the catalytic bed. Since it is necessary to mix fresh air with the raw engine exhaust gases prior to introduction into the muffler in order to assure substantial completeness of elimination, the fresh air thus mixed has a cooling effect on the raw engine exhaust, which of course does not encourage complete elimination. This cooling effect is offset by the heating effect of the portion 16a of the member 16. On the other hand, the member 16b, which extends into the lower chamber B of the apparatus, transfers heat from the center of the catalyst bed to the oxidized exhaust gases. The oxidized gases, of course, contain more sensible heat than the unoxidized gases, and for that reason the member 16b will not be so effective as member 16a for cooling the central portions of member 16. However, the portion 16b will nonetheless have a decided cooling effect on the beam 16 since in operation there will be a temperature differential between the gases in chamber B and the central portion of the catalytic bed. If desired, this portion 16b of the beam 16 may be omitted.

Figure 4:
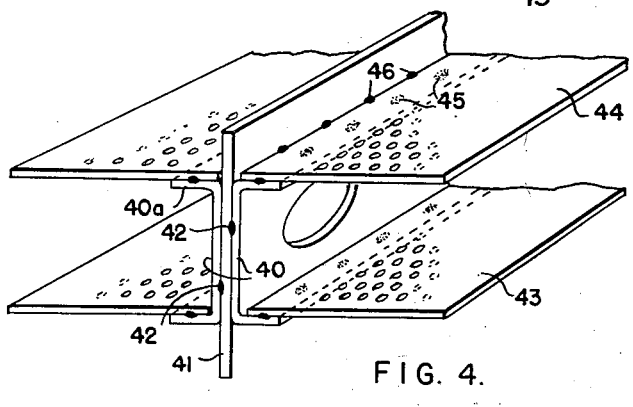
Fig. 4 shows an alternative type of beam and heat exchanger.

Referring now to the alternative form of my invention shown in Figs. 4 and 5. it can be seen that in Fig. 4 I provide the beam in the form of two channels indicated by the reference numerals 40. These channels are placed back-to-back with a heat exchange member 41 therebetween, the member 41 being of rectangular cross-section and extending into the chambers above the trays. As indicated by reference numeral 42 the beams 40 are welded as by spot welding to the sides of the member 41. The trays in this modification indicated by the reference numerals 43 and 44, are secured to the flanges 40a of the beams 40. The beams extend longitudinally within the housing, not shown in Fig. 4, and each tray 43, 44 is therefore supported centrally thereof by the beam 40. The trays rest on the flanges of the beam, are welded thereto as indicated by reference numeral 45, and are also welded to the member 41 as indicated at 46. It is understood that with the embodiment of Figs. 4 and 5 the edges of the trays may be supported in the manner shown in Figs. 2 and 3 by guideways such as the guideways 19, however, in the interest of clarity, the members 19 are not shown in these figures. It is also apparent that the members 16 or Figs. 1 to 3 is in all respects analogous to the members 41 and 40 of Fig. 4, although in Fig. 4 a somewhat more substantial central support is provided for the trays by virtue of the flanges 40a provided on beams 40. With the embodiment shown in Fig. 4, it is desirable to provide a direct support on the housing end plates for the beam. Fig. 5 shows such a support in the form of bracket members indicated by reference numeral 45, which are secured to the end plate 46 of the housing.

With bracket supports for the beam as in Figs. 4 and 5, it is possible, if desired for purposes of simplicity of construction, to dispense with the guideway supports for the edges of the trays, particularly in mufflers of relatively small size. The beam 40 with such an arrangement would be capable of providing all the support necessary for the trays 43 and 44. The manner of supporting the ends of the beams 40, shown in Fig. 5, permits this member to expand and contract independently of the housing under conditions of severe thermal gradients and fluctuations.

It is contemplated, of course, that various changes might be made to the disclosed embodiment of my invention within the scope thereof. For example, it is contemplated that the tray section of the type shown at 14a, 14b might be further divided into a plurality of components. Each section 14a, in other words, might itself be divided into a plurality of components by slitting the tray sections in several places parallel to the transverse edge thereof. As explained in my previous application, Serial Number 318,382, sectional trays of this sort provide distinct advantages in that the imposition of thermal stresses over the length of the tray is minimized. As another possible alternative to the disclosed preferred embodiment of my invention, several beds of catalytic material might be provided with each bed extending parallel to the others. Such a structure would require one set of trays for each bed, each bed being provided with a single beam as shown. Also, other types of beams might be provided such as an ordinary I-beam with the trays secured to the upper and lower flanges of the beams. A structure of this type would not require trays having side-by-side coextensive sections (such as 13a, 13b, 14a, 14b), since the trays could be secured directly to the flat surfaces on the flanges of the beam. Alternatively, other types of heat exchangers might be provided within the scope of the present invention; for example, heat exchangers secured directly to the trays and extending within the chambers A and B of Fig. 1.

Other modifications and adaptations of my invention will be apparent to those skilled in the art to which it appertains.

I claim:

1. Catalytic apparatus suitable for attachment to the exhaust outlet of an internal combustion engine for oxidizing toxic and obnoxious components of the exhaust gases therefrom comprising a housing, a rigid beam extending longitudinally within said housing in the central portion thereof, said beam being arranged horizontally with respect to its length and vertically with respect to its width, a pair of horizontally arranged vertically spaced-apart foraminous trays rigidly fastened to said centrally located beam in parallel relationship along the length thereof, said trays extending laterally from said beam in both directions to the walls of said housing and defining between them a space for receiving a layer of catalyst pellets, the beam and tray assembly being carried by said housing by means permitting limited sliding motion between said assembly and said housing whereby said assembly is free to expand and contract thermally independently of said housing.

2. Catalytic apparatus suitable for attachment to the exhaust outlet of an internal combustion engine for oxidizing toxic and obnoxious components of the exhaust gases therefrom comprising a housing, a rigid beam extending longitudinally within said housing in the central portion thereof, said beam being arranged horizontally with respect to its length and vertically with respect to its width, a pair of horizontally arranged foraminous trays rigidly fastened to said centrally located beam along the length thereof in parallel spaced-apart relationship adjacent the upper and lower edges thereof, said trays extending laterally from said beam in both directions to the walls of said housing and defining between them a space for receiving a layer of catalyst pellets, said space being divided centrally and longitudinally by said beam which thus serves to provide rigid support for said trays along the length of and centrally of the beam and tray assembly, said beam and tray assembly being carried by said housing by means permitting limited sliding motion between said assembly and said housing whereby said assembly is free to expand and contract thermally independently of said housing.

3. Catalytic apparatus suitable for attachment to the exhaust outlet of an internal combustion engine for oxidizing toxic and obnoxious components of the exhaust gases therefrom comprising a relatively elongated shell, end plates closing the end of said shell, at least one of said end plates being removable, a unitary beam and tray assembly adapted to be inserted into said shell as a unit upon removal of one of said end plates, said beam and tray assembly comprising a rigid beam arranged horizontally with respect to its length and vertically with respect to its width, a pair of horizontally arranged vertically spaced-apart foraminous trays rigidly fastened to said beam in parallel relationship along the length thereof, said trays extending laterally from said beam in both directions so as to define between then a space for receiving a layer of catalyst pellets extending longitudinally and laterally within said shell for substantially the full length and width thereof, said beam and tray assembly, when inserted into said shell, being carried thereby in such manner as to permit limited sliding motion between said assembly and said shell whereby said assembly is free to expand and contract thermally independently of said shell.

4. Catalytic apparatus suitable for attachment to the exhaust outlet of an internal combustion engine for oxidizing toxic and obnoxious components of the exhaust gases therefrom comprising a relatively elongated shell, end plates closing the ends of said shell, at least one of said end plates being removable, a unitary beam and tray assembly insertable as a single unit into said shell upon removal of one of said end plates, said beam and tray assembly comprising an elongated rigid beam arranged horizontally with respect to its length and vertically with respect to its width, a pair of horizontally arranged foraminous trays rigidly fastened to said beam along the length thereof in parallel spaced-apart relationship adjacent the upper and lower edges thereof, said trays extending laterally from said beam in both directions and defining between them a space for receiving a layer of catalyst pellets, said space being divided centrally and longitudinally by said beam which thus serves to provide rigid support for said trays along the length of and centrally of the beam and tray assembly, guideways provided on the internal surface of said shell to slidably receive the lateral edges of said trays when said beam and tray assembly is inserted into said shell, said guideways permitting limited sliding motion between said beam and tray assembly and said shell whereby said assembly is free to expand and contract thermally independently of said shell.

5. Catalytic apparatus in accordance with claim 4 in which the internal surfaces of said end plates are provided with means for slidably receiving and supporting the end portions of said beam-tray assembly.

6. Catalytic apparatus suitable for attachment to the exhaust outlet of an internal combustion engine for oxidizing toxic and obnoxious components of the exhaust gases therefrom comprising a housing, a rigid beam extending longitudinally within said housing in the central portion thereof, said beam being arranged horizontally with respect to its length and vertically with respect to its width, a pair of horizontally arranged vertically spaced-apart foraminous trays rigidly fastened to said centrally located beam in parallel relationship along the length thereof, said trays extending laterally from said beam in both directions to the walls of said housing and defining between them a space for receiving a layer of catalyst pellets, said trays being fastened to said beam intermediate the upper and lower edges thereof whereby the central portion of the width of said beam is disposed within said layer of catalyst pellets, while the upper and lower portions of the width thereof project beyond said trays, said projecting portions serving to transfer heat from said layer of catalyst pellets into the stream of exhaust gases during operation of said apparatus, the beam and tray assembly thus provided being carried by said housing by means permitting limited sliding motion between said assembly and said housing whereby said assembly is free to expand and contract thermally independently of said housing.

References Cited in the file of this patent
UNITED STATES PATENTS

| | | |
|---|---|---|
| 1,522,111 | Franck-Philipson | Jan. 6, 1925 |
| 1,867,325 | Neville | July 12, 1932 |
| 2,218,604 | Dill | Oct. 22, 1940 |
| 2,270,360 | Voorhees | Jan. 20, 1942 |
| 2,330,068 | Marancik et al. | Sept. 21, 1943 |